UNITED STATES PATENT OFFICE.

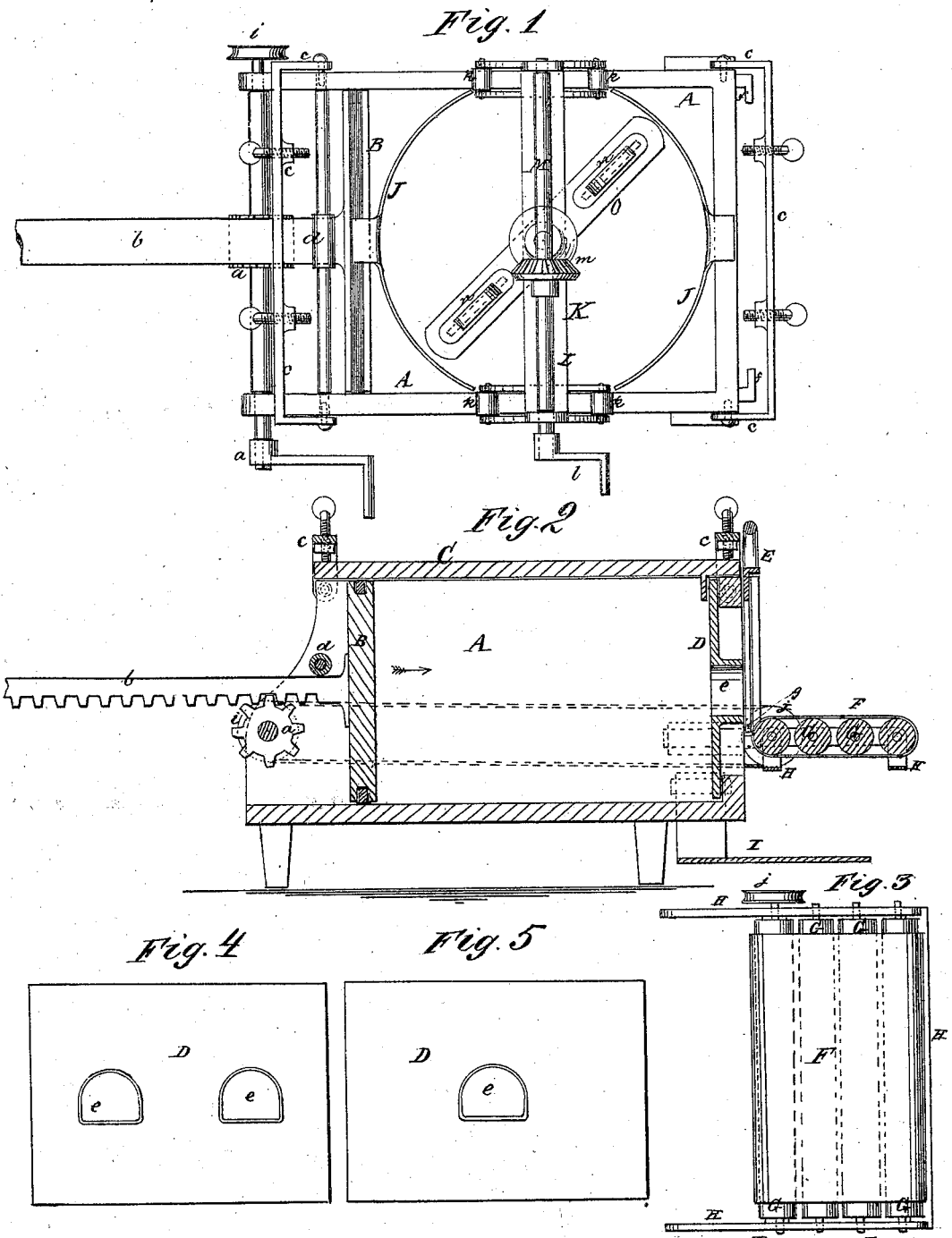

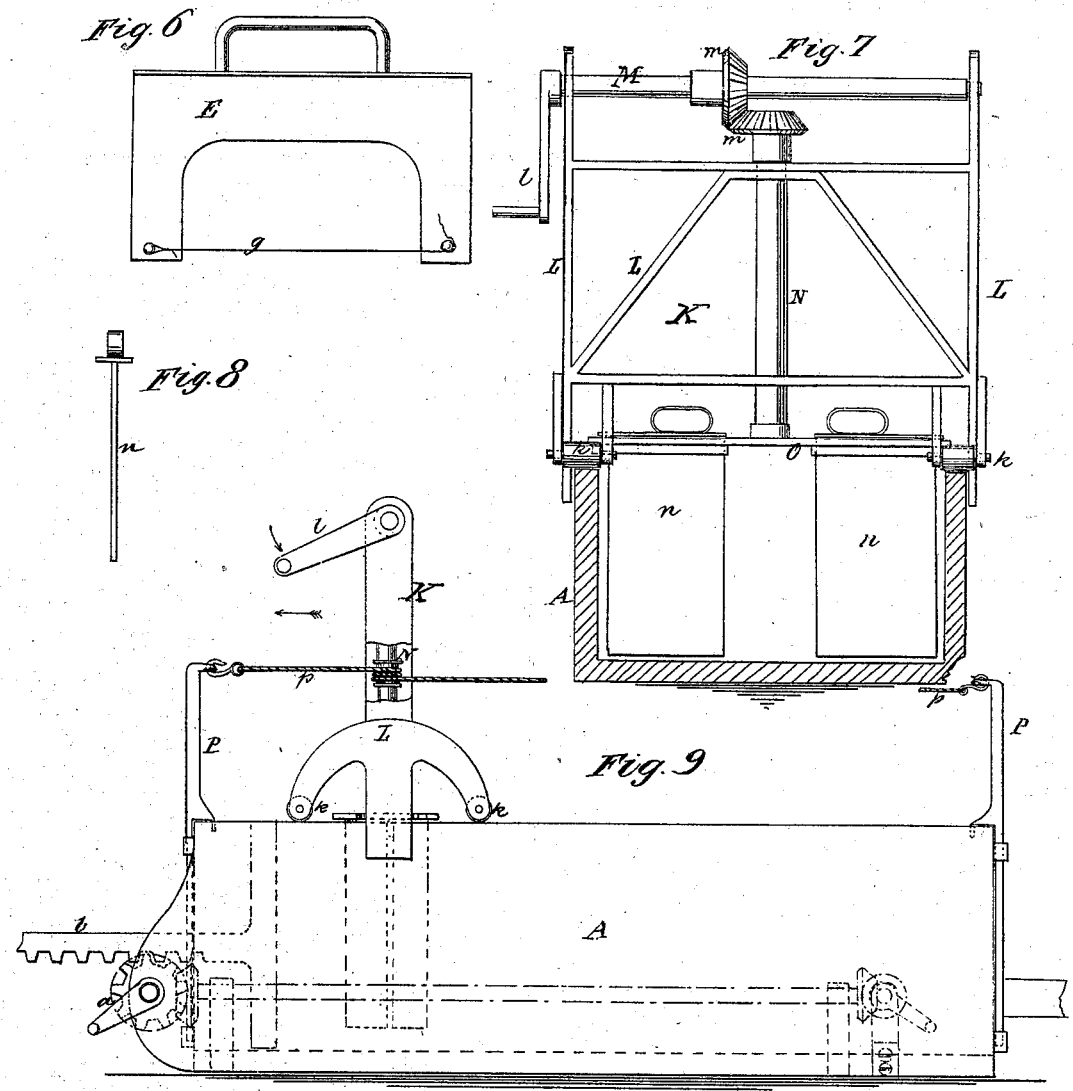

ADAM R. STEEN, OF BROOKLYN, NEW YORK.

IMPROVEMENT IN BREAD-MACHINES.

Specification forming part of Letters Patent No. 150,440, dated May 5, 1874; application filed September 19, 1873.

*To all whom it may concern:*

Be it known that I, ADAM R. STEEN, of the city of Brooklyn, in the county of Kings and State of New York, have invented an Improved Machine for Making Bread, of which the following is a specification:

My invention has for its object to produce a machine for making bread in which kneading by hand is obviated, the dough is thoroughly mixed by machinery, and, when ready, is pressed out through apertures suitable to the size of loaves required, which, in issuing from the machine, are cut to the desired weight or measure, the operation of pressing out the dough at the same time cleaning out the machine; and it consists in the construction and combinations of the various parts of the machine whereby this object is attained, all of which will be hereinafter described, reference being had to the accompanying drawings, in which—

Figure 1, Sheet I, represents a top view of a small machine for family use, and ready for the operation of kneading. Fig. 2 is a longitudinal vertical section of the same ready for forming, weighing or measuring, and cutting off the loaves, the kneading apparatus being removed. Fig. 3 is a plan view of the endless apron, onto which the loaves, in being formed, are pushed out. Fig. 4 is a form-plate provided with apertures for making two loaves at a time. Fig. 5 is a similar plate with only one aperture for making one loaf at a time. Fig. 6, Sheet II, is a detail of the sliding knife or cutter. Fig. 7 is a side view of the kneading apparatus in position for use. Fig. 8 is an edge view of one of the kneading-blades. Fig. 9 is a side view of the machine designed for bread-making in larger quantities, the kneading apparatus being arranged to travel back and forth the whole length of the trough while revolving. Fig. 10 is a cross-section of the box of the machine when provided with two troughs or compartments for mixing two different kinds of dough at the same time.

Similar letters of reference indicate like parts in the different figures.

A is a rectangular horizontal box, provided with one or more troughs or compartments, according as required. B is a square piston or follower operated by a crank and pinion, *a*, and rack *b*, by which force is imparted for pressing out the dough, and by which, also, the position of the piston may be adjusted to produce a larger or smaller capacity of the trough, according to the amount of dough to be kneaded. A friction-roller, *d*, working on the side of the rack *b*, opposite to that of the pinion *a*, keeps the rack and pinion in gear with each other. C is a cover, which, when the dough is ready, is secured tightly to the box A by the screw-clamps *c*, which latter are hinged or pivoted to the box A, as seen in Figs. 1 and 2, so that they may be turned down and out of the way when it is desired to remove the cover C. The piston B is provided with a rubber packing inserted in and around its entire edge, and by which it fits so tight to the sides, bottom, and cover of the box A that the latter will be scraped entirely clean of all dough by the forward motion of the piston B. The laborious and unpleasant work of cleaning the trough by hand is thereby rendered unnecessary. D is the form-plate, provided with apertures *e* of the shape and circumference proportioned to that desired to be given to the loaf by pressing the dough through the said aperture by a forward motion imparted to the piston B. For different sizes and numbers of loaves to be made at a time, I make a set of interchangeable plates, D, with one or more apertures, *e*, and of various sizes. E is the cutter, sliding vertically in ways *f*, and working close to the aperture *e*. It consists of a frame (see Fig. 6) open downward, and far enough up to allow of free passage of the dough through the aperture *e* and the said opening in the frame, when the cutter is pushed down to its lowest position in the ways *f*. For a knife I prefer a fine wire, *g*, stretched across the lower open end of the cutter-frame, as seen in Fig. 6.

By this construction the cutter can be made to operate with equal facility on its upward as on its downward movements.

F is an endless apron working on rollers G, having their bearings in a frame, H, which is attachable to the machine in any simple convenient manner. I is a platform attachable to the machine for the purpose of placing thereon a scale for weighing the bread. In doing this the frame and apron H F are not attached to the machine, but placed on the scale, and as the dough issuing from the aperture $e$ is carried forward on the apron F, it is cut by raising or depressing the cutter-frame E at the instant when the scale indicates that the apron has received an amount of dough of the exact weight required of the loaf. The same aperture $e$ being used, the weight of the dough will, of course, depend on the length of the loaf. This length being ascertained by measuring once while weighing, a stop or marker may be attached to the frame H, and the latter to the machine, the scale dispensed with, and loaves made of equal weights by operating the cutter each time the dough has moved forward on the apron far enough to reach the mark thus made. The apron F is operated by an elastic belt or cord applied from the pulley $i$ on the same shaft as the pinion $a$, to the pulley $j$ on the same shaft as one of the rollers G.

Thus far I have described the machinery and operations for forming, weighing, and cutting the loaves from the ready-made dough, and of cleaning the box A by the piston B.

I will now describe the apparatus by which the mixing and kneading are performed, or the dough made. The capacity of the trough being adjusted by the piston B, I insert in the box A two semicircular plates, J, one at each end, (as seen in Fig. 1,) and fitting tight to the sides and bottom of the box A. In the trough so formed I then put the material for making the dough, and apply the kneading apparatus K. This consists of a frame, L, mounted upon rollers $k$, by which it is supported, and on which it can be made to move with facility back and forth on the upper edges of the two longer sides of the box A. This frame L is provided with a horizontal shaft, M, turned by a hand-crank, $l$, and an upright shaft, N, connected by beveled gear-wheels $m$ with the shaft M, and provided at its lower end with a cross-bar, O, in which latter are holes to receive the kneading-blades $n$. By turning the crank $l$ the kneading-blades $n$ are made to revolve with the cross-bar O on the shaft N, and the flour is mixed and the dough kneaded. The blades $n$ are so placed in the cross-bar O that, in revolving, their edges will work close to the sides of the box, whereby all lumps, otherwise apt to be formed by the flour, are broken up and a thorough kneading effected. The semicircular plates J allow the blades $n$ to work equally as close at the ends of the box as to its sides. The blades $n$ fit so tight in their places in the cross-bar O that, by simply withdrawing them, the adhering dough will be scraped off. When the dough is ready the kneading apparatus K and the plates J are removed, and the cover C secured to the box, as before described.

In order to make the kneading apparatus effective in a large machine, such as is suitable for use in bakeries, on board steamships, &c., it is necessary that, while revolving the shaft N and blades $n$, the whole frame should be moving back and forth the whole length of the trough. This is accomplished, as seen in Fig. 9. To each end of the machine is attached an upright or standard, P, to which is fastened either end of a rope or cord, $p$, wound two or three turns around one of the shafts N of the frame L, or around a pulley secured on the shaft N. In revolving the crank $l$ and the kneading-blades $n$ the rope $p$ will be wound on the shaft N on one side and off on the other, and the ends of the rope being stationary and fixed the kneading apparatus K will move forward toward the end of the machine from which the rope $p$ winds on the shaft N.

In order to enable the operations of pressing out and cutting the dough to be performed by one person only, I use, to supply the large machines with, a counter-shaft and gearing, Q, as shown in dotted lines in Fig. 9, operated by a hand-crank at the end of the machine where the cutting is performed. The pressure of the piston forces the gases of fermentation uniformly through the whole mass of the dough, which, thereby, after leaving the aparture $e$, enlarges somewhat and becomes porous, making a better bread than that generally made from hand-kneaded dough. Another advantage is that, less water being required for kneading by machine than by hand, less heat is wasted for its vaporization in baking.

Having thus described my invention, what I claim as new, and desire to secure by Letters Patent, is—

1. The kneading apparatus K, consisting of the parts L M N O $k$ $l$ $m$ $n$, in combination with the box A, to operate substantially as and for the purpose specified.

2. The combination of the box A, piston B, operated and provided with rubber, as described, and cover C, secured by screw-clamps $c$, with the form-plate D and the cutter E, all constructed and operating substantially as and for the purpose specified.

3. The endless apron F, in combination with the box A, provided with cover C, piston B, form-plate D, and cutter E, substantially as and for the purpose specified.

4. The cutter E, constructed, as described, to operate in both directions, and sliding in the ways $f$, in combination with the form-plate D, substantially as specified.

ADAM R. STEEN.

Witnesses:
JOHN McCORMACK,
AXEL C. HANSON.